Oct. 1, 1968     R. L. HOOTEN     3,403,753
DISC BRAKE
Filed April 13, 1967     2 Sheets-Sheet 1
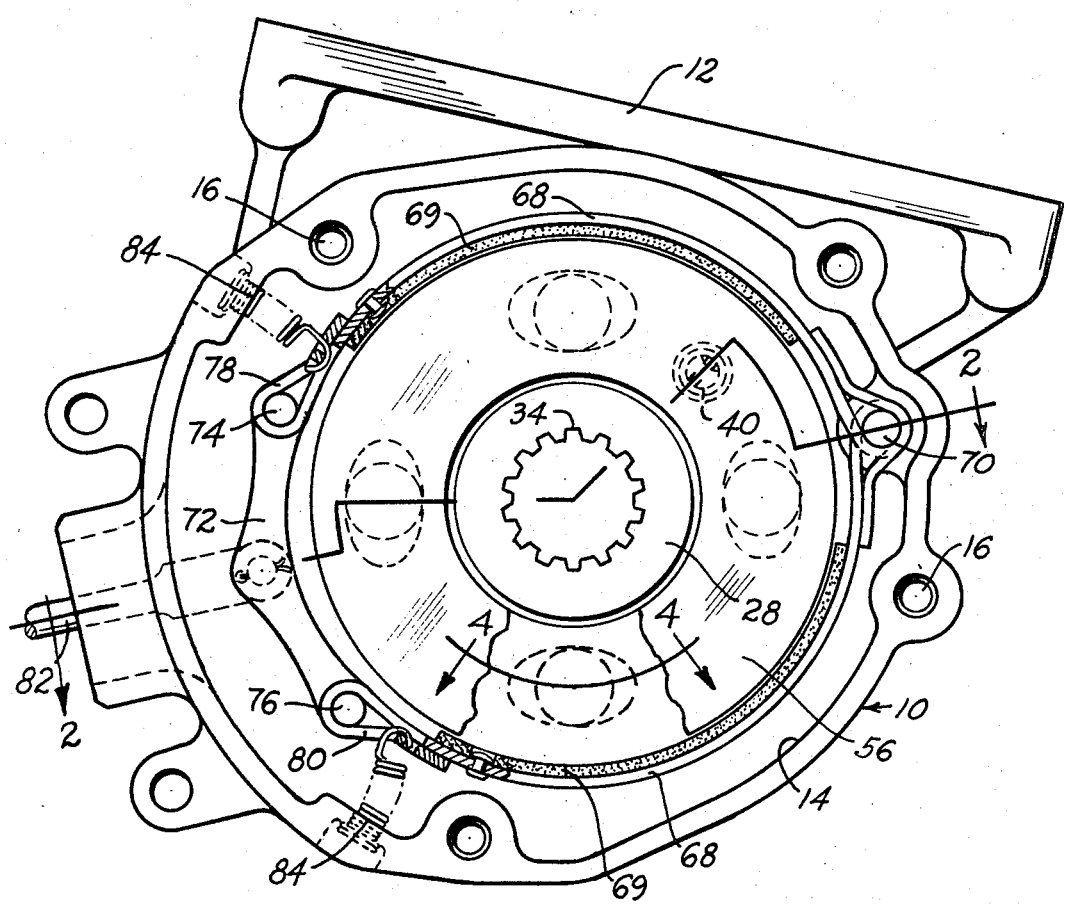
FIG_1
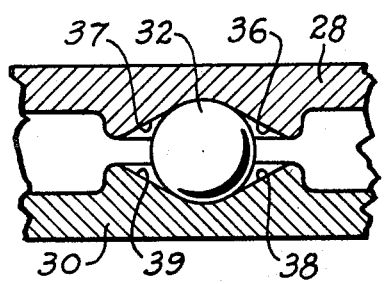
FIG_4
INVENTOR.
ROBERT L. HOOTEN.
BY
ATTORNEY.

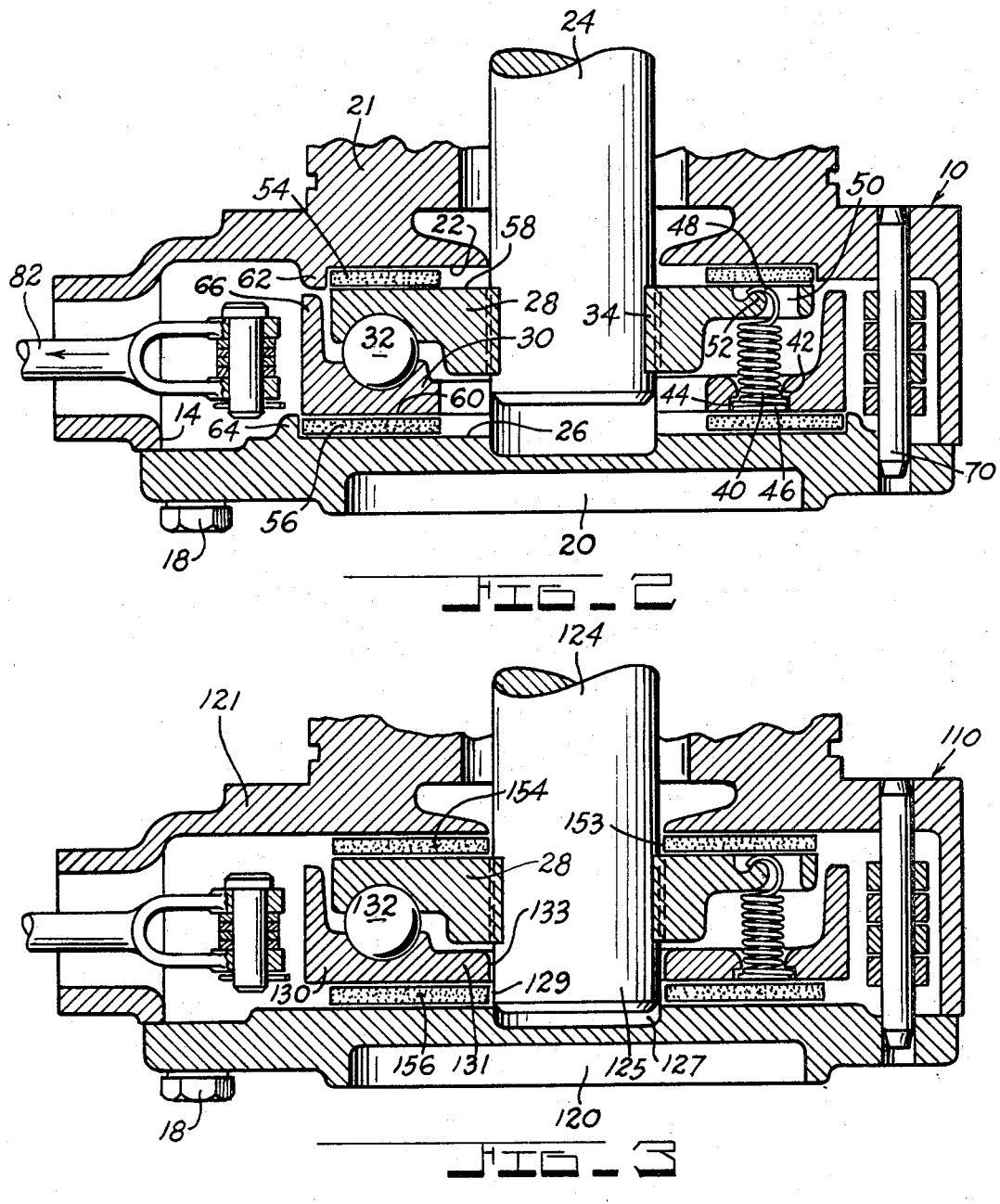

United States Patent Office 3,403,753
Patented Oct. 1, 1968

3,403,753
DISC BRAKE
Robert L. Hooten, South Bend, Ind., assignor to The Bendix Corporation, a corporation of Delaware
Filed Apr. 13, 1967, Ser. No. 630,709
1 Claim. (Cl. 188—70)

ABSTRACT OF THE DISCLOSURE

A disc brake having at least two axially related relatively rotatable members formed with vertically opposed friction faces for engagement with a friction lining member floatingly located between said faces to receive braking torque.

Background of the invention (1) The invention concerns an improvement to disc brakes of the type having opposed relatively rotatable members equipped with annular braking surfaces engageable with the two sides of an annular friction lining member floatingly carried between said rotatable members for braking action.

(2) Disc brakes of the type to which this invention relates having been employed quite generally for heavy duty braking requirements, such as tractors, although the invention has capabilities on all types of vehicles. The disc brakes with which I am familiar either rivet or cement the friction lining to the realtively rotatable members which receive the braking torque. This necessitates disassembling the brake and removing the members to which the lining is attached when replacing a worn out lining. Moreover, there is also the expense incurred in removing the old lining from the brake members and cementing or riveting the new lining thereto. This makes maintenance and servicing of brakes of this type costly and unnecessarily complicated by the fact that the brake must be torn down and disassembled to replace the worn out brake linings.

Summary of the invention

It is an important object of this invention to provide a disc brake in which the friction lining is floatingly carried between two opposed annular braking surfaces.

It is another object of this invention to provide a disc brake in which the friction lining is supported between two opposed annular braking surfaces in such a manner as to allow said lining axial movement with respect to said braking surfaces.

It is a further object of the invention to provide a disc brake in which the friction lining member is an annulus formed with flat, vertical, oppositely-facing surfaces, and supported at its outer or inner diameter for axial movement.

It is a still further object of this invention to provide a disc brake of the type herein shown that is simple and inexpensive to service in the field.

Other objects and features of the invention will be apparent from the following description of the brake taken in connection with the accompanying drawings.

Brief description of the drawings

FIGURE 1 is a view of the brake from the outboard side as mounted on a vehicle, with the brake housing cover removed;

FIGURE 2 is a view in sections of the brake taken on the line 2—2 of FIGURE 1;

FIGURE 3 is a sectional view similar to FIGURE 2, illustrating a modified form of the invention; and FIGURE 4 is a fragmentary view taken on the line 4—4 of FIGURE 1, showing the discs and ball arrangement.

Description of the preferred embodiments

Referring now to the drawings and particularly to FIGURES 1 and 2, illustrating the preferred embodiment of the invention, the brake housing is indicated by reference numeral 10 and is formed with an integrally related bracket member 12 which supports the housing on a fixed part of an associated vehicle, not shown. The housing 10 is open on its outboard side at 14 to permit servicing the brake. The housing is formed with threaded holes 16 arranged about the circumference of the outboard portion of the housing 10 to receive bolts 18 for securely holding a cover 20 to the housing 10. The inboard side of the housing 10 is formed with an inner wall 21 having a flat braking surface 22, vertically or radially disposed with respect to the axis of a shaft 24 which is connected to a rotating part of the vehicle to be braked, not shown. The cover 20, which forms an outer wall of the housing, is likewise formed with a vertically or radially extending flat annular braking surface 26 disposed opposite of, and in parallel relationship to the braking surface 22 formed in the wall 21. These two braking surfaces 22 and 26 are formed in the housing walls 21 and 20, respectively, so as to take the braking torque in the frame of the vehicle, not shown, via bracket 12.

Interposed in the housing cavity formed between the two walls 21 and 20 are two discs or rings 28 and 30, the former being splined to the shaft 24 and the latter being drivably connected to the former through a series of balls 32. That is, the disc 28 is splined to shaft 24 through the splines 34 for axial movement on the shaft.

As observed in FIGURES 2 and 4, the discs 28 and 30 are operatively connected by means for controlling their axial displacement. This axial displacement of the discs is accomplished by forming the inner opposed faces of the discs with a plurality of spaced recesses 36 and 38, respectively, for receiving the spherical members or balls 32. In the brake illustrated in FIGURE 1, there are four such spherical members spaced appropriately in mating recesses 36 and 38 around the discs or rings a prescribed radial distance for actuating the rings or discs 28 and 30 in an axial direction in a manner to be hereinafter described. The recesses 36, 38 are conical shaped, having inclined walls or faces 37 and 39, respectively, for receiving the spherical members or balls 32. It will be noted that these recesses are arranged in an elongated manner circumferentially around the rings or discs 28 and 30 to allow for camming action on the faces 37 and 39 to cause axial movement between the discs as a result of their relative rotation. With the vertices of the conical portions 36 and 38 in registry, the discs are rotated to their brake release position by coil springs 40. There are two such springs diametrically located, one with respect to the other. Since the springs 40 are of identical construction and are attached to the discs 28 and 30 in a similar manner, the securing together of the two discs by the springs will be described in connection with one spring only. The disc 30 is provided with an opening 42 for receiving the small diameter of the spring 40 and a counterbore 44 which receives the enlarged head 46 of the spring 40. The end of the spring opposite from the enlarged head is formed with a hook 48 which extends through an aperture 50 of the disc 28 for engagement with a projection 52 formed in the disc 28 adjacent the opening 50. Because of the opposed relationship of the inclined faces of the recesses any relative rotation between the discs will cause the spherical members 32 to cam the discs 28 and 30 axially in opposite directions to thereby squeeze friction lining members 54 and 56 between the discs and their respective associated walls 21 and 20. The disc 28 which is splined to the shaft 24 is formed with an annular braking surface 58 to be engaged by lining 54 and the disc 30 is formed with an annular braking surface 60 which frictionally engages the lining 56. The friction lining member 54, shown as a flat annular ring, is floatingly supported on a circumferentially extending ledge 62 formed on the wall 21 of the housing 10, adjacent the braking surface 22. The friction lining member 56, also shown as a flat annular ring, is floatingly carried by a ledge 64 circumferentially located on the wall 20, forming the cover, adjacent the frictional surface 26 so as to support the lining member at its outer periphery. The supporting means for the friction lining members, ledges 62 and 64 of FIGURE 2, permits independent axial and radial movement of the members with respect to their associated discs, the shaft and the housing walls.

In order to produce relative rotation between the discs 28 and 30 to cause axial displacement between them, the disc 30 is formed with a flange member 66 around which extends, over a greater portion of its circumference, a brake band 68 pivotally mounted to the housing 10 by element 70. Lining 69 is secured to the band 68 in any suitable manner, such as by riveting. The free ends of the band 68 opposite the element or pin 70 are connected by a bridge member 72 through pins 74, 76, passing through loops 78 and 80, respectively, of the brake band. A brake actuating lever 82 is articulated to the bridge 72 at its midpoint so that outward movement of the actuating lever will establish engagement of the band member with the flange 66 to retard the latter, thus causing relative movement between the discs or rings 28 and 30. Springs 84 are interconnected between the housing 10 and the band 68 to maintain a clearance between the lining 69 and the flange 66 in brake release position. Accordingly, the actuating lever 82, bridge 72, band 68, lining 69, flange 66 and connecting structure provide means for including axial movement to said discs through retardation of one of said discs.

*Mode of operation of preferred embodiment*

To make a brake application, the actuating member 82 is moved in the direction of the arrow, either hydraulically or mechanically, as the case may be, to cause the brake band 68 and hence the lining 69 to engage the flange member 66, whereupon the member 30 is retarded with respect to its relative rotation to the member 28, which is splined to the shaft 24. This difference in rotation between the members 28 and 30 causes angular movement therebetween, resulting in camming action by the balls or spheres along their conical surfaces to thereby urge the members in axially opposite directions against the lining members 54 and 56 to brake the shaft 24. Upon releasing the operating force from the actuating member 82, the springs 84 withdraw the band 68 from its retarding engagement of the flange 66, at which time the springs 40 return the disc members 28, 30 to their release position, so that the friction lining members 54, 56 are once again freely and floatingly carried on their outer peripheries by ledges 62, 64, respectively.

In order to replace the friction lining members 54, 56, it requires only that the bolts 18 be taken out so that the cover 20 can be removed to thereby expose the interior of the housing cavity for replacing the worn lining. Removing the cover 20 permits replacement of the lining 56 and withdrawal of the assembly comprising the discs 28 and 30, held in assembled relationship by springs 40, so that the friction lining member 54 located at the inboard side of the brake can be replaced.

*Description of the modified embodiment*

In the embodiment shown in FIGURE 3, those parts which are identical to corresponding parts of the preferred embodiment, FIGURE 2, will be given the same identifying numbers. Those parts of FIGURE 3 having corresponding parts in FIGURE 2 which are of different construction, size, or shape will be given the same number as its counterpart with the number 100 added thereto.

In the embodiment of FIGURE 3, brake lining member 154, which is in the form of a flat annular ring, is floatingly supported on shaft 124. The outer end 125 of the shaft terminates in a recess 127 of the cover 120, which forms one wall of the housing 110. The wall 120 is, in fact, a removable cover held in position on the housing by bolts 18. The brake lining member 154 is formed with a central opening 153, having a diameter slightly greater than that of the shaft 124 to carry said lining member thereon for rotational and axial movement between the disc 28 and the wall 121 of the housing 110.

Disc 130 has a radial inwardly extending portion 131 which terminates short of the shaft 124 in an opening 133, through which the shaft protrudes. A brake lining member 156, which, like member 154, is also in the form of a flat annular ring, is floatingly supported on shaft 124 which projects through an opening 129 of the lining member. The opening 129 is slightly greater in diameter than the diameter of the shaft 124 to permit free rotational and axial movement of the lining member between the disc 130 and the wall 120 of the housing 110.

Instead of using the two ledges 62 and 64 to support the lining members in FIGURE 2, and the shaft 124 to support the lining members in FIGURE 3, the brake of FIGURE 3 can be modified by substituting the housing wall 21 and the lining member 54 for the housing wall 121 and the lining member 154, thereby having a brake in which one lining member is supported by the housing and the other lining member is supported by the shaft.

The actuation and performance of the modified form of brake shown in FIGURE 3 is practically identical to the preferred embodiment of FIGURE 2 and needs no further description of operation.

While the specific details have been herein shown and described, the invention is not confined thereto, as other substitutions can be made within the spirit and scope of the invention.

I claim:
1. A brake comprising a housing having spaced-apart inner opposed walls forming a brake cavity with an opening thereinto and ledges on each of said walls inwardly of the opening, a rim located radially outwardly of said ledges at the outer periphery of one of said walls and extending therefrom into abutment with the other of said walls, two discs located in the cavity between said opposed walls, a shaft rotatably positioned in the cavity, one of said discs being drivably mounted on said shaft, and the other of said discs being formed with a flange at its outer periphery, said discs having relative rotation therebetween and being movable axially, one with respect to the other, means operatively connecting said discs for controlling their axial movement, two friction lining members, one disposed between each disc and a respective one of said walls, said lining members being annular rings floatingly supported at the outer periphery thereof by said ledges such that said lining members have independent axial and radial movement, with respect to said shaft, said discs and said walls, a band assembly arranged for cooperative engagement with said flange, and means projecting into said housing through said opening and operatively connected to said band assembly for establishing axial movement of said discs toward said walls to thereby cause frictional engagement between said lining members, discs, and opposed walls.

(References on following page)

References Cited

UNITED STATES PATENTS

| | | | |
|---|---|---|---|
| 2,907,425 | 10/1959 | Pierce | 192—70 X |
| 2,955,680 | 10/1960 | Caero. | |
| 3,204,727 | 9/1965 | Wilson et al. | 192—70 X |

FOREIGN PATENTS 1,167,670  4/1964  Germany.

MILTON BUCHLER, *Primary Examiner.*

G. E. A. HALVOSA, *Assistant Examiner.*